3,009,889
COMPOSITION PREPARED BY REACTING FORMALDEHYDE WITH A UREA-OXIDIZED STARCH REACTION PRODUCT AND PROCESS OF MAKING
Peter Borchert, Elkhart, Ind., assignor to Miles Laboratories, Inc., Elkhart, Ind., a corporation of Indiana
No Drawing. Filed Jan. 19, 1959, Ser. No. 787,387
6 Claims. (Cl. 260—17.3)

This invention relates to new and useful chemical compounds and particularly to oxymethylated (and methoxymethylated) derivatives of urea-dialdehyde starch polymers. More specifically, the present invention pertains to novel reaction products of formaldehyde and urea-modified dialdehyde starch compounds, or "polyglucosylol-urea" compounds of the following structural formulae:

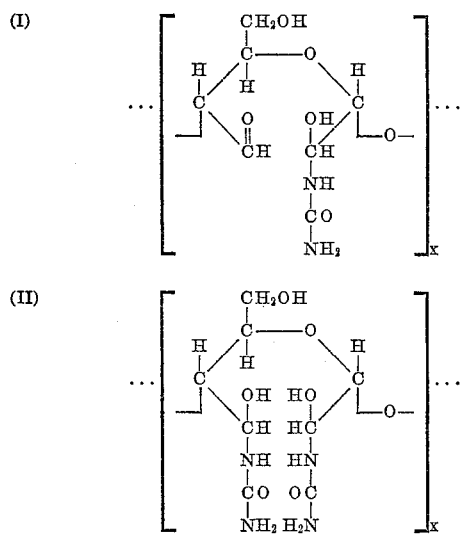

wherein $x$ represents the number of repeating units in the molecule, which may number as many as several thousand.

The above urea-dialdehyde starch adducts, the starting materials in the practice of this invention, are described in my copending applications, Serial Nos. 765,274, filed October 6, 1958, and 771,190, filed November 3, 1958, and are claimed therein, respectively, in their processes of preparation (Compound I) and in their chemical composition (Compound II). Application S.N. 771,190 is now abandoned. The above-mentioned applications disclose carbonyl addition reactions, respectively, of one mole of urea under mild conditions or two moles of urea in the presence of an acidic catalyst with 2,3-dialdehyde starch (periodate oxidized starch or, in short, oxystarch).

In accordance with the present invention these two types of "polyglucosylol-urea" compounds, containing either one or two urea moieties, as indicated by the above graphic formulae, may be reacted with formaldehyde to introduce methylol groups by substitution of one, two, or possibly all three of the active hydrogen atoms contained in the urea group(s) of the starting materials. More particularly, this oxymethylation is carried out in an aqueous or aqueous-methanolic phase within a wide pH range (2-7) by adding as source of formaldehyde commercial formalin to a dispersion or solution of the respective oxystarch-urea compounds. By addition of methanol a partial conversion of methylol groups to the corresponding methoxy methyl groups is effected if a strong acidic catalyst is present.

It is to be noted that the presence of catalysts, type of solvent or dispersing agent, temperature, pH and other reaction conditions affect the introduction of methylol groups and the formation of cross-linkages. The many possible variations of reaction conditions and the consequent modifications of the reaction products are illustrated by the following description of embodiments:

A. Reactions of formaldehyde with a "polyglucosylol-urea" compound containing only one urea moiety (Compound I above) will be illustrated by the following examples:

Example I (1) Eight grams of water-soluble urea-modified oxystarch. [Water, 13.3%; N, 8.0%—calcd.: N, 8.7% for a monourea derivative of an alkali-pretreated water-soluble dialdehyde starch with 73.3% of oxidized polymer units. This is equivalent to 5.5 g. (0.025 mole) of monourea-oxystarch compound.]

(2) 15 ml. of water.

(3) 10 ml. of formalin (37%) (3.7 g. formaldehyde= 0.1 mole).

(1) was dissolved in (2) and (3) was added to the solution at 20–25° C. The pH was then 5–6 due to the presence of some formic acid from formalin. After standing for 24 hours at room temperature the reaction product was precipitated with the same volume of acetone, and the white, greasy mass separated and dissolved in 20 ml. of water. Then the final compound was precipitated by pouring the aqueous solution of the purified oxymethylol adduct with rapid stirring into methanol. After filtration, the desired compound was washed with methanol and acetone and dried in an oven at 40–50° C. The compound was soluble in water at ordinary temperatures. Yield: 7 g. Analysis calcd. for a compound containing two methylol groups: N, 6.9. Found: N, 6.3; water, 12.8 (K.F.).

Example II (1) 15 g. of water-soluble urea-modified oxystarch [water, 6.4%; N, 9.0—calcd.: N, 9.6 for a monourea derivative of an alkali-pretreated water-soluble dialdehyde starch with 75.6% of oxidized polymer units. This is equivalent to 11.1 g. (0.05 mole) of monourea-oxystarch compound.]

(2) 20 ml. of formalin (37%) (7.4 g. formaldehyde= 2.47 mole).

(1) was dissolved in (2) with heating at 35–45° C. Then the mixture (pH 5 because of the presence of formic acid) stood at room temperature for one hour at 30–40° C. The viscous, clear solution was poured, with rapid stirring, into methanol. The white precipitate was filtered, washed with methanol and acetone and dried at room temperature overnight. The reaction product, an amorphous fine powder, was insoluble in cold or hot water. Yield: 17–18 g. Analysis calcd. for a compound containing two methylol groups: N, 7.6. Found: N, 7.0; water, 8.0 (K.F.).

Example II shows that when in an experiment otherwise similar to that of Example I the reaction temperature is raised to 35–45° C., the water-soluble urea-oxystarch compound reacts with formaldehyde so as to form methylene-type cross-links, such as —$CH_2$— and —$CH_2OCH_2$—. This product is colloidally dispersed in the original reaction mixture and is evidenced by its high viscosity. It is possible that additional dehydration occurs when the reaction mixture is poured into organic solvents, as in this instance into methanol.

Example III (1) 6 g. of water-soluble urea-modified oxystarch [water, 2.65; N, 8.3—calcd.: N, 9.7 for a monourea derivative of an alkali-pretreated water-soluble dialdehyde starch with 73.3% of oxidized polymer units. This is equivalent to 4.63 g. (0.021 mole) of monourea-oxystarch compound.]

(2) 20 ml. of water.
(3) 5 ml. of formalin (1.85 g. formaldehyde=.062 mole).
(4) 10 ml. of methanol.
(5) 3 ml. of sulfuric acid (50%).

(1) was dissolved in (2) and (3). To this resulting mixture (4) and (5) were added at room temperature (25-30° C.). After standing for three days, the clear solution (pH 2) was poured into 200 ml. of methanol. The precipitate was filtered, washed with methanol and acetone and dried at room temperature. The compound was partially soluble in water. Yield: 5–6 g. Analysis calcd. for a compound containing two methylol groups: N, 7.3. Found: N, 6.0; water, 9.0; methoxy ($CH_3O$—), 1.81.

In the above experiment a partial conversion of methylol groups to the corresponding methyl ether groups was effected in the presence of a strong acidic catalyst by addition of methanol to the water-soluble urea-oxystarch polymer. But even after standing for 3 days at room temperature the final product had a low methoxy content as the ratio of polymer units containing methyl ether groups to non-methoxymethylated polymer units was calculated to be 1:6. This may be ascribed to the competitive and even dominant formation of methylene-type cross-links catalyzed by sulfuric acid.

*Example IV*

(1) 20 g. of water-insoluble urea modified oxystarch [water, 4.32; N, 8.4—calcd.: N, 9.6 for a monourea derivative of a water-insoluble dialdehyde starch with 73.3% of oxidized polymer units. This is equivalent to 15.1 g. (0.0685 mole) of monourea-oxystarch compound.]
(2) 50 ml. of methanol.
(3) 50 ml. of formalin (40%) (20 g. formaldehyde=.67 mole).
(4) 1 ml. of formic acid (85—90%).

The slurry containing (1), (2), (3) and (4) was stirred under heating for two hours at 40–50° C. and one hour at 50–60° C. After cooling it was filtered, washed with methanol and acetone, and dried at 50° C. for 30 minutes. The compound was not soluble in water, aqueous alkali and mineral acids at ordinary temperatures. Yield: 23–24 g. Analysis calcd. for a compound containing two methylol groups: N, 7.6. Found: N, 6.3%; water, 6.1% (K.F.).

In accordance with this example an acidic catalyst and temperatures ranging from about 40 to 60° C. must be employed to effect the oxymethylation of a water-insoluble oxystarch urea adduct obtained from a reaction of urea with dialdehyde starch which had not been subjected to an alkali treatment. In part the insolubility of the reaction product can be attributed to the existence of cross-linkages of the type —$CH_2$— and —$CH_2OCH_2$— formed in consequence of elevated temperatures and presence of acidic catalyst.

B. Reactions of formaldehyde with a "polyglucosylolurea" compound containing two urea moieties (Compound II above), will be illustrated by these examples:

*Example V*

(1) 15 g. of urea-modified oxystarch [N, 15.4—calcd.: N, 16.8 for a diurea derivative of dialdehyde starch in dry form with 75.6% of oxidized polymer units. This is equivalent to 12.4 g. (0.044 mole) of diurea-oxystarch compound.]
(2) 50 ml. of formalin 37% (18.5 g. formaldehyde=.62 mole).

The slurry containing (1) and (2) was stirred at room temperature for 8 hours (pH 5–6 because of the presence of some formic acid from formalin). After addition of the same volume of methanol, the precipitate was filtered, washed with methanol and acetone, and dried for 15 minutes at 60–70° C. The white powder was practically insoluble in cold and hot water and in most organic solvents. Yield: 18 g. Analysis calcd. for a compound containing four methylol groups: N, 11.8. Found: N, 10.01; water, 5.6 (K.F.).

As shown by the above example, an excess of formaldehyde was employed for the purpose of facilitating introduction of methylol groups to a high degree, while at the same time the experiment was carried out at room temperature or temperatures up to but not above 35° C. to impede formation of cross-linkages, such as —$CH_2$—, —$CH_2OCH_2$—. However, due to the presence of a weak acidic catalyst, namely, formic acid contained in formalin, some methylene-type links may have formed, rendering the product water-insoluble.

*Example VI*

(1) 24 g. of urea-modified oxystarch [N, 15.4—calcd.: N, 16.8, for a diurea derivative of dialdehyde starch with 75.6% of oxidized polymer units. This is equivalent to 20.3 g. (0.072 mole) of diurea-oxystarch compound.]
(2) 80 ml. of methanol.
(3) 48 ml. of formalin 37% (15.6 g.=.576 mole).
(4) 5 ml. of sulfuric acid (50%).

The slurry containing (1), (2), (3) and (4) was heated under stirring on a water bath at 60–70° C. for one hour. After cooling, the precipitate was filtered, washed with methanol and acetone and dried for one hour at 50–60° C. The slight yellow polymer was practically insoluble in cold and hot water and in most organic solvents. Yield: 22–23 g. Analysis calcd. for a compound containing three methylol groups and one methoxymethyl group: N, 11.4. Found: N, 9.4; water, 5.3 (K.F.); methoxy ($CH_3O$—), 6.3.

In the above experiment the methanol present effected an ether formation or a methoxymethylation, which is attributable to the presence of a strong acidic catalyst. However, under the conditions of this experiment a quantitative methoxymethylation does not take place. The percentage of methoxymethyl groups formed is 6.3%, i.e., there is one —$CH_2OCH_3$ group per polymer unit. As in Example III, methylene-type bridges are likely to have formed as sulfuric acid is present in the reaction mixture.

A survey of the above examples in terms of substituents of the replaceable hydrogen atoms shows in summary that depending on the reaction conditions one or two or possibly even three of the active hydrogens in the given urea moieties are replaced by any of the following terminal or cross-linking groups: —$CH_2OH$, —$CH_2$—, —$CH_2$—O—$CH_2$—, —$CH_2OCH_3$. The methylene-type bridges, as is well known in the art, are set up by virtue of dehydration due to the employment of a neutral or acidic medium in conjunction with elevated temperatures. Additional dehydration may occur when in order to precipitate the desired product the reaction mixture is poured into organic solvents, such as methanol and acetone used in some of the experiments described above.

Due to the nature of the starting materials and reaction conditions, it is difficult to assess which and how many active hydrogens are replaced. Consequently, it is difficult to stipulate the exact nature of the intra- and intermolecular arrangements as well as those within each polymer unit, as will be appreciated by those versed in the art.

The invention is not limited to the exact details recited in the above examples, which are merely illustrative, but may be embodied in other equivalent forms within the purview of the inventive concept.

The new oxymethylated urea-oxystarch compounds have a great number of applications, especially with regard to industrial uses. Thus, for example, they are useful in plastics, adhesives, laminating, molding, textile treating, paper-treating, and paper-additive industries. They also have utility for further chemical modifications and synthesis.

In summary, the present invention pertains to oxymethylated and methoxymethylated urea-2,3-dialdehyde starch polymers obtained by reacting—in the presence of an inert solvent or dispersing agent at a pH ranging from about 2 to 7 and at a temperature ranging from about 25° to 70° C.—formaldehyde with a "polyglucosylol-urea" compound wherein either one or two of the carbonyl groups of oxystarch have undergone addition reactions with urea.

What is claimed is:

1. As a composition of matter, an oxymethylated urea derivative of 2,3-dialdehyde starch obtained by intimately contacting in a reaction medium taken from the group consisting of water and methanol at a temperature ranging from about 25 to 70° C. and at a pH ranging from about 2 to 7, formaldehyde with a "polyglucosylol-urea" compound selected from the group consisting of compounds whose polymer units correspond to the following general formulae:

(I) 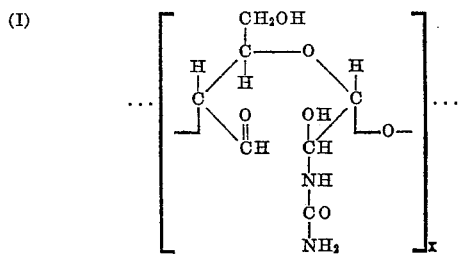

(II) 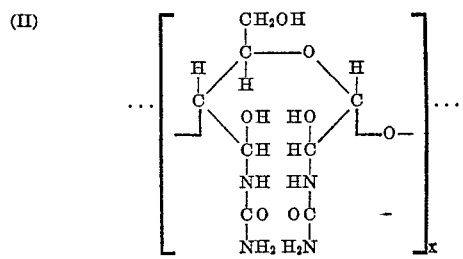

wherein $x$ represents the number of repeating units in the molecule.

2. As a composition of matter, an oxymethylated monourea derivative of 2,3-dialdehyde starch obtained by intimately contacting in a reaction medium taken from the group consisting of water and methanol at a temperature ranging from about 25 to 70° C. and at a pH ranging from about 2 to 7, formaldehyde with a "polyglucosylol-urea" compound which comprises structural units of the formula:

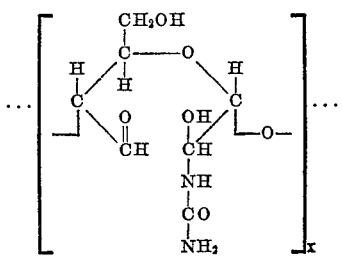

wherein $x$ represents the number of repeating units in the molecule.

3. As a composition of matter, an oxymethylated and methoxymethylated urea derivative of 2,3-dialdehyde starch obtained by intimately contacting in a reaction medium consisting of methanol at temperatures from 25 to 30° C. and at a pH of from 2–3, formaldehyde with a "polyglucosylol-urea" compound which comprises structural units of the formula:

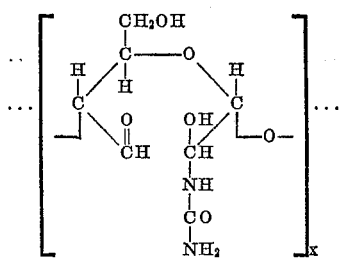

wherein $x$ represents the number of repeating units in the molecule.

4. As a composition of matter, an oxymethylated diurea derivative of 2,3-dialdehyde starch obtained by intimately contacting in the presence of a dispersing agent taken from the group consisting of water and methanol at a temperature ranging from about 25 to 70° C. and at a pH ranging from about 2 to 7, formaldehyde with a "polyglucosylol-urea" compound which comprises structural units of the formula:

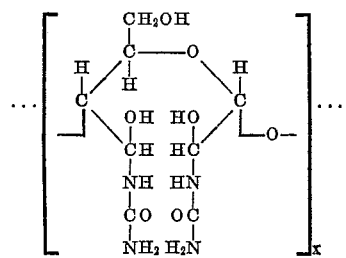

wherein $x$ represents the number of repeating units in the molecule.

5. As a composition of matter, an oxymethylated and methoxymethylated diurea derivative of 2,3-dialdehyde starch obtained by intimately contacting in a reaction medium consisting of methanol at a temperature of from 60 to 70° C. and at a pH of from 2–3, formaldehyde with a "polyglucosylol-urea" compound which comprises structural units of the formula:

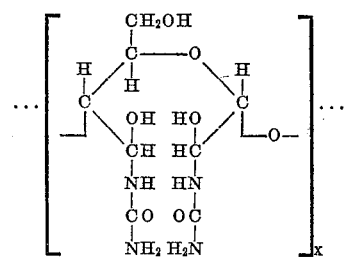

wherein $x$ represents the number of repeating units in the molecule.

6. A process for the preparation of an oxymethylated urea derivative of 2,3-dialdehyde starch which comprises reacting—by intimately contacting in a reaction medium taken from the group consisting of water and methanol at a temperature ranging from 25 to 70° C. and at a pH ranging from 2 to 7—formaldehyde with a "polyglucosylol-urea" compound selected from the group consisting of compounds whose polymer units correspond to the following general formulae:

(I) 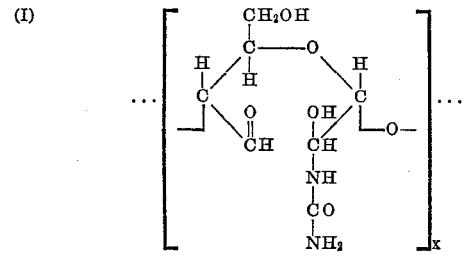

(II) 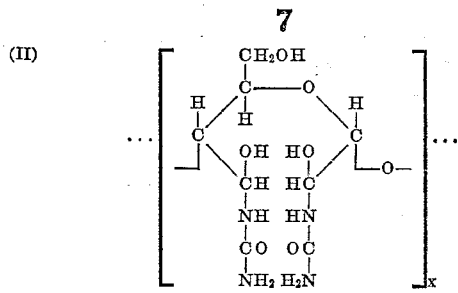
wherein $x$ represents the number of repeating units in the molecule.
References Cited in the file of this patent
UNITED STATES PATENTS
| | | |
|---|---|---|
| 2,725,362 | Gaver et al. | Nov. 29, 1955 |
| 2,886,542 | Kremer | May 12, 1959 |
OTHER REFERENCES
Sloan et al.: "Ind. & Eng. Chem.," volume 48, July 1956, pages 1165–1172.